March 20, 1962  R. E. McADAM ET AL  3,025,758
PHOTOGRAPHIC PRINTER
Filed March 5, 1959  3 Sheets-Sheet 3

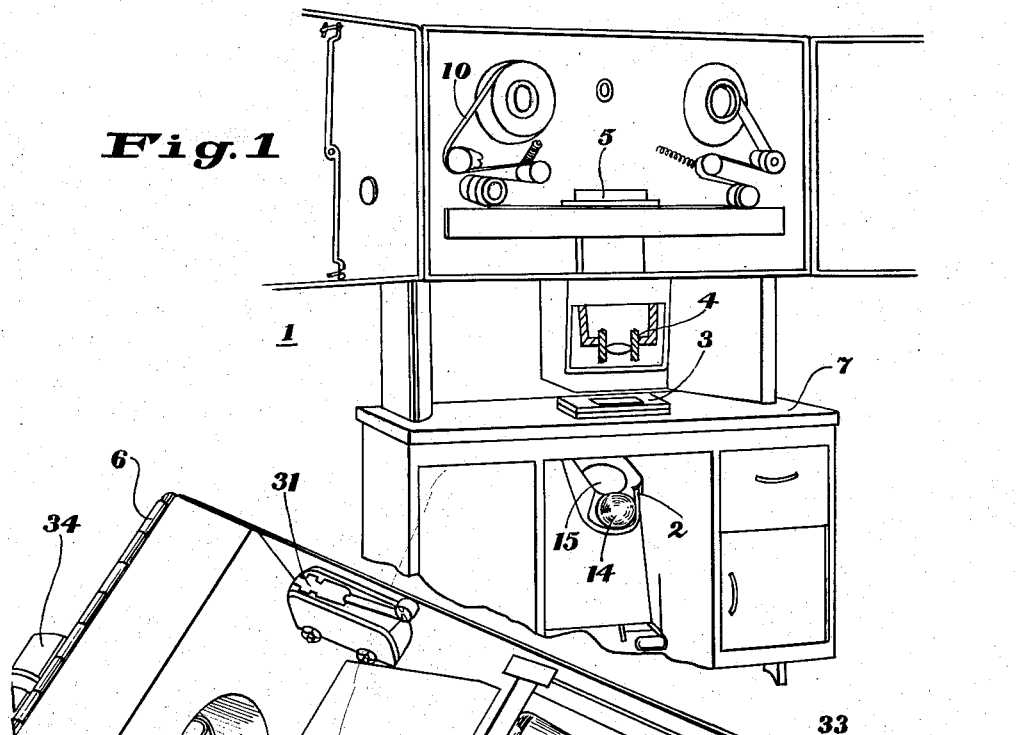
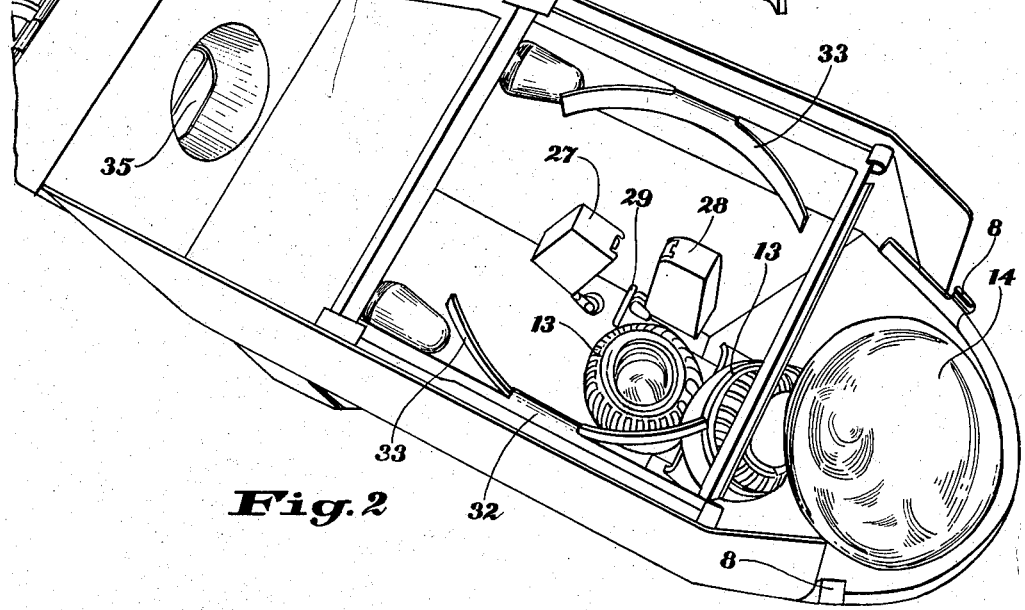
Ralph E. McAdam
Edward K. Letzer
John S. Pollock
INVENTORS

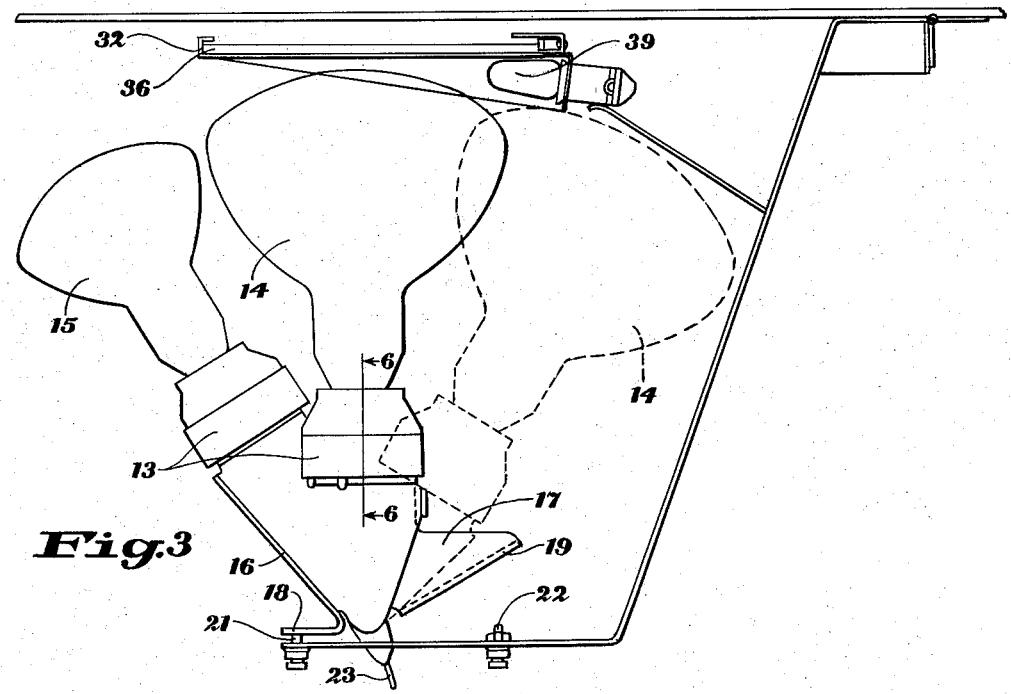
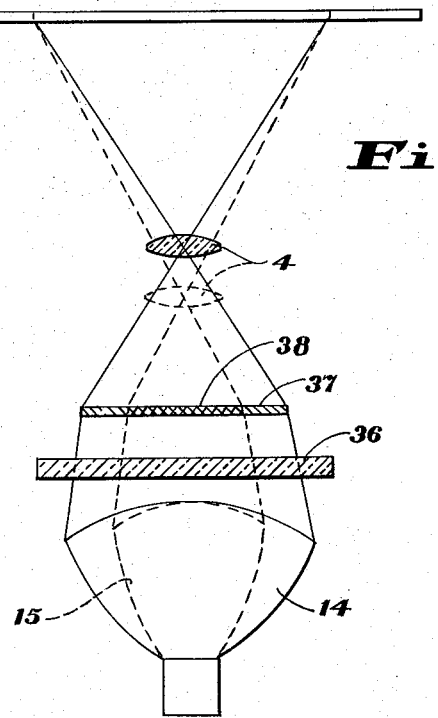

Ralph E. McAdam
Edward K. Letzer
John S. Pollock
INVENTORS

BY R. Frank Smith
Steve W. Grumbau
ATTORNEYS

United States Patent Office 3,025,758
Patented Mar. 20, 1962

3,025,758
PHOTOGRAPHIC PRINTER
Ralph E. McAdam, Edward K. Letzer, and John S. Pollock, Rochester, N.Y., assignors to Eastman Kodak Company, Rochester, N.Y., a corporation of New Jersey
Filed Mar. 5, 1959, Ser. No. 797,456
5 Claims. (Cl. 88—24)

This invention relates generally to printers, and more specifically to an improved photographic printer for accommodating a range of negative sizes and making satisfactory prints therefrom while maintaining the exposure time and power consumption of the printer substantially constant.

In a photographic printer having a film gate for accommodating a range of negative sizes, it is extremely desirable to maintain a minimum variation of exposure times in the printing operation. In order to accomplish this, it is necessary to maintain the total quantity of light in lumens passing through any selected negative at a substantially constant value. Where the total quantity of light passing through each negative regardless of its size is the same, the total quantity of light striking the light-sensitive print material is substantially constant for each negative. Now, in photographic printers where a single lamp is used for illuminating the negative, the quantity of light passing through each negative varies directly with respect to the area of the negative since the brightness or concentration of light energy in luminous flux per unit area of the lamp is substantially constant for each negative and the total quantity of light passing through each negative is equal to the product of the brightness and area of the negative. Where the size of the print made from the various negatives is fixed, it is apparent that the quantity of light striking the print material will be less for a small negative than a large one. In order to compensate for this differential in quantity of light striking the print for a range of negative sizes, it is necessary to increase the exposure time for the smaller negatives. This is highly inconvenient as well as difficult to accomplish satisfactorily. Should the operator undercompensate in the exposure time allotted, which is not unusual, a defective print will result. This is not only costly but time-consuming as well, since the operator will have to rerun the negatives until the prints made therefrom are satisfactory. In view of this, it is obvious that a need exists in the photofinishing art for a printer in which the need to adjust the exposure time depending on the size of the negative to be printed is minimized. Applicants' invention is believed to more nearly achieve this objective than any prior known photographic printers.

The primary object of the present invention is to provide an improved photographic printer in which the total quantity of light passed through any selected negative of a range of negative sizes is maintained at a substantially constant value.

Another object of this invention is to provide an improved photographic printer for minimizing the necessity of adjusting the exposure time to compensate for the change in size of the negative to be printed.

One more object of this invention is to provide an improved photographic printer for printing a complete range of negative sizes at a substantially constant exposure time, and with the power consumption of the printer maintained substantially constant.

Still another object of this invention is to provide an improved lamp house for a photographic printer that is of simple design and construction, thoroughly reliable and efficient in operation, and economical to manufacture.

Objects and advantages other than those set forth above will be apparent from the following description when read in connection with the drawings; in which:

FIG. 1 is an elevation view in perspective of a photographic printer embodying the present invention;

FIG. 2 is an enlarged perspective view of the lamp house looking at it from the top;

FIG. 3 is a side elevation view partly in section of a portion of the lamp house;

FIG. 4 is a diagrammatic view showing the optical path of the photographic printer with two different sized negatives and two different sized lamps;

Figure 5:
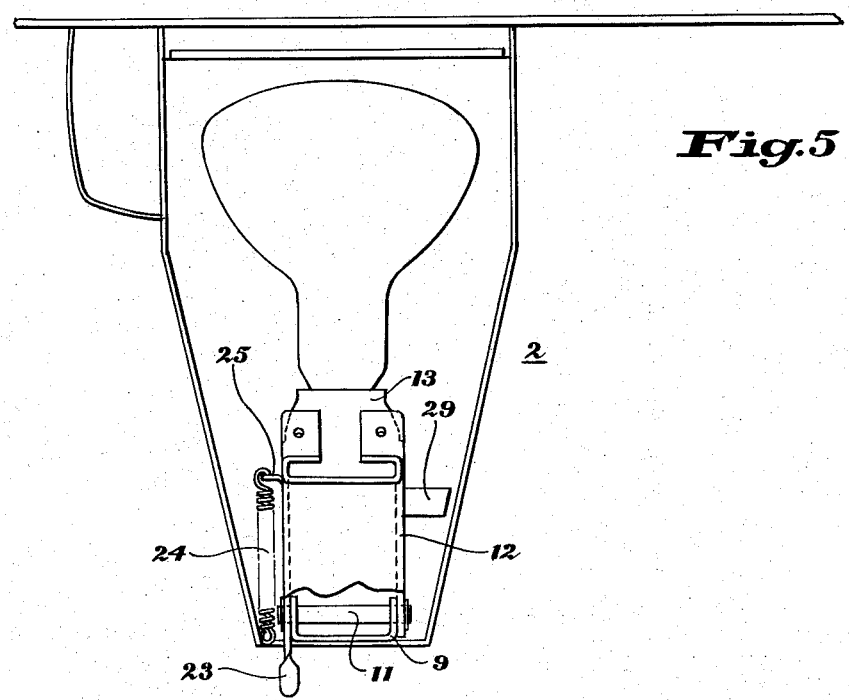
FIG. 5 is a side elevation view, partly in section, of the lamp house of FIG. 3 with the smaller lamp omitted and a portion of the structure broken away.

As shown in the drawings, a preferred embodiment of this invention is embodied in a photographic printer 1 having a lamp house 2, a film gate 3 for accommodating different sized negatives, a vertically adjustable objective lens system 4 for focusing the negative image onto a light-sensitive print material 10, and a print material support structure 5 for holding the print material 10 in a position to receive the image from the negative.

Figure 6:
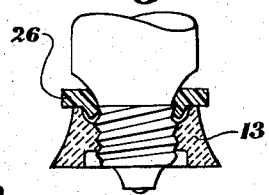
FIG. 6 is a segmental section view taken along line 6—6 of FIG. 3.

The lamp house 2 has a hinge 6 along one edge for hingedly securing the lamp house to the cabinet 7 of the printer. The lamp house 2 is movable between a closed position in which the front end of the lamp house is releasably secured to the cabinet 7 by a pair of latches 8 engaging complementary portions of the cabinet, and an open position as shown in FIG. 1 with the latches 8 released permitting the lamp house 2 to pivot downwardly about the hinge 6. The bottom of the lamp house 2 has a U-shaped bracket 9 secured thereto as best seen in FIG. 5 for supporting a bolt 11 upon which the lamp socket base 12 is pivotally mounted. The base 12 is provided with a pair of angularly spaced-apart lamp sockets 13 for receiving a large reflector lamp 14 and a small reflector lamp 15 as seen in FIG. 3, each lamp having the same power rating which, in this particular use is 300 watts, and designed to concentrate and direct the light in a beam to more effectively use the entire light output of each lamp. Although each lamp 14, 15 emits substantially the same total quantity of light, the light from the larger lamp 14 is directed over a larger area than the light from the smaller lamp 15 and hence the brightness or luminous flux per unit area is less for the larger lamp. The base 12 is provided with a pair of brackets 16, 17 having outwardly extending arms 18, 19 respectively. The lamp socket base 12 is pivotally movable between a first operating position with arm 18 in engagement with an adjustable stud 21 and lamp 14 in optical alignment with the objective lens 4, and a second operating position with arm 19 engaging another adjustable stud 22 with lamp 15 positioned along the optic axis of the objective lens 4. The lamp socket base 12 is manually movable into one or the other of the operating positions by lever 23 and is maintained in the selected position by an over-center spring 24 having one end connected to a lip 25 formed by the base and the opposite end connected to the lamp house 2 as seen in FIGS. 3 and 5. The adjustable studs 21, 22 provide a fine adjustment in a longitudinal direction for assuring that the selected lamp is positioned along the optic axis of the objective lens 4. Adjustable means, not shown, may also be provided for adjustably positioning the selected lamp along the optic axis in a lateral direction. In order to prevent the lamps 14, 15 from loosening in their sockets due to vibration, etc. during the operation of the printer 1, the lamps are provided with silicone rubber lock washers 26 as seen in FIG. 6.

Figure 7:
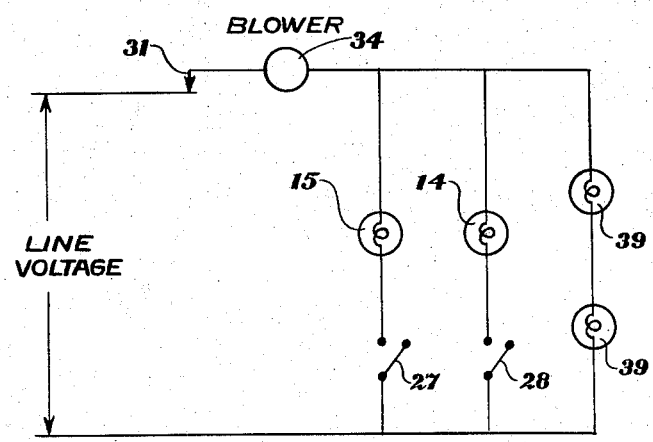
FIG. 7 is a schematic wiring diagram of the lamp house.

A pair of spaced apart light switches 27, 28 are mounted on the lamp house housing 2, one for each of the lamps 15, 14 respectively and they are selectively actuable by a projection 29 carried by the lamp socket base 12. Accordingly, when the base 12 is moved into one or the other of the operating positions, the light switch 27 or 28 corresponding to the lamp positioned in the optic axis of the objective lens 4 is closed completing the electrical circuit to the lamp as seen in FIG. 7. A normally open interlock switch 31 is also mounted on the lamp house housing 2 and is adapted to engage a switch actuating member carried by the cabinet 7 when the lamp house 2 is in a closed or operating position for closing switch 31. It is obvious that as soon as the lamp house is released by the latches 8 and moved into the open position that the interlock switch 31 would open thereby disconnecting the source of power to the lamp house 2. This interlock switch is a safety feature to assure that the power is cut off from the lamp house 2 when the lamp house is in an open position for lamp replacement, cleaning, or other forms of maintenance.

The lamp house 2 is further provided with a frame 32 having light baffles 33 to direct the light from the lamp so that rectangularly shaped negatives are illuminated uniformly over the entire negative, see FIG. 2. Normally, even when using a diffuser, the illumination at the center of the negative appears to be substantially greater than the illumination in the corner portions of the negative. The light baffles 33 tend to provide some fill-in illumination for the corner areas thereby achieving greater uniformity of illumination over the entire negative. A glass heat absorbing plate 36 as seen in FIGS. 3 and 4 is supported by the frame 32 and is designed to absorb the heat rays emitted by whichever lamp is operating. A blower 34 is mounted at one end of the lamp house 2 for blowing air through a baffled opening 35 across the glass plate for dissipating the heat absorbed by the glass and thereby assuring that the negative and glass plate 36 do not become damaged by the heat. Viewing lamps 39 are provided so that the operator can readily observe the position of the lamps 14, 15 in the lamp house 2.

In the operation of this invention, let us assume initially that the operator desires to make some prints from a large negative 37 as seen in FIG. 4. The lamp socket base 12 is pivoted by lever 23 into an operating position placing the larger lamp 14 along the optic axis of the objective lens 4. In this position, substantially the total quantity of the light produced by the lamp 14 passes through the negative 37 as shown in full lines in FIG. 4. Now let us assume that the operator places a small negative 38 in the film gate 3 but does not change the lamp 14. It is obvious upon inspection of the optic system in FIG. 4 that a good portion of the light emitted by lamp 14 would be wasted and would not pass through the negative 38. Consequently, the total quantity of light passing through the smaller negative 38 which is equal to the product of the lamp brightness and area of negative is less than for the larger negative 37 varying substantially directly with the area of the negative, and hence the quantity of light is considerably less also. If the same exposure time were used for both negatives 37, 38 the print made from the small negative 38 would be underexposed. However, let us see what happens if the operator moves the lamp socket base 12 into the other operating position placing the small lamp 15 in optical register with the objective lens 4. In this position, once again almost the entire quantity of light emitted by lamp 15 passes through the small negative 38 and strikes the print material 10 as seen dotted in FIG. 4. Since the brightness of the small lamp 15 is greater than the brightness of the larger lamp 14, the total quantity of light passing through the smaller negative 38 is substantially equal to the total quantity of light passing through the larger negative 37 when the larger lamp 14 is used. Accordingly, the print made from the small negative 38 using the small lamp 15 has substantially the same exposure time as the print made from the large negative 37 using the larger lamp 14. Now if there should happen to be six different sized negatives from which prints are to be made, the operator could select one exposure time which would result in the best possible exposure for the second largest and second smallest negatives. Then when the remaining negatives are used, the prints would be very slightly underexposed or overexposed; a matter which could be compensated for by selective diaphragming of the projection lenses to produce satisfactory prints. Consequently, by using the two lamps 14, 15 and some selective diaphragming of the projection lenses, it is possible for the operator to make satisfactory prints covering the entire range of negative sizes while maintaining the exposure time, and the power consumption of the printer substantially constant.

The invention has been described in detail with particular reference to preferred embodiments thereof, but it will be understood that variations and modifications can be effected within the spirit and scope of the invention as described hereinabove and as defined in the appended claims.

We claim:

1. In a photographic printer, the combination comprising: first means for supporting a light sensitive print material in an exposure plane; second means adapted to selectively support a first negative and a second negative of a size larger than said first negative; an objective lens having an optic axis and interposed between said first and second means for focusing the selected negative image on said print material; and a lamp house disposed below a selected negative and in register therewith, said lamp house having a small reflector lamp and a large reflector lamp of substantially the same power rating and said small lamp having substantially all of its light energy directed through an area substantially equal to the area of said first negative, and said large lamp having substantially all of its light energy directed through an area substantially equal to the area of said second negative, said lamps being movable between a first printing position with said small lamp in register with the optic axis of said lens when prints are being made from said first negative, and a second printing position with said large lamp in register with the optic axis of said lens when prints are being made from said second negative whereby the total quantity of light passing through each negative and striking the print material in each printing position, the exposure time and the power consumption of said printer during the printing operation is maintained substantially constant for each of said negatives.

2. The invention according to claim 1 wherein said lamp house is pivotally movable between a closed position for connecting a power source to said lamps, and an open position disconnecting said power source from said lamps and disposing said lamp house in an accessible position for maintenance.

3. The invention according to claim 1 wherein said lamp house comprises a support member; a base member pivotally mounted on said support member and carrying a pair of angularly spaced apart lamp sockets for receiving said pair of lamps; separate stop means carried by said lamp house and adapted to selectively engage said base member for stopping said base member with one of said lamps in one of said first and second printing positions; a handle provided by said base member and projection out of said lamp house and adapted to be manually engaged for moving said base member and lamps from one to the other of said first and second printing positions; and resilient means for holding said base member and lamps in one of said first and second printing positions.

4. The invention according to claim 3 wherein said separate stop means comprise adjustable studs carried by said lamp house and engageable by separate arms carried by said base member, and said resilient means comprises an off center spring having one end connected to said lamp house and the opposite end connected to said base member.

5. The invention according to claim 1 wherein said lamp house is pivotally movable between a closed position for connecting a power source to said lamps, and an open position disconnecting said power source from said lamps and disposing said lamp house in an accessible position for maintenance, said lamp house further comprising a support member, a base member pivotally mounted on said support member and carrying a pair of angularly spaced apart lamp sockets for receiving a pair of lamps; separate adjustable stop means carried by said lamp house and selectively engageable by separate arms carried by said base member for stopping said base member with one of said lamps in one of said first and second printing positions; a handle provided by said base member and projecting out of said lamp house and adapted to be manually engaged for moving said base member and lamps from one to the other of said first and second printing positions; and an off center spring having one end connected to said lamp house and the opposite end connected to said base member for holding said base member and lamps in one of said first and second printing positions.

References Cited in the file of this patent

UNITED STATES PATENTS

| | | |
|---|---|---|
| 1,675,595 | Bouin | July 3, 1928 |
| 1,742,372 | Taylor | Jan. 7, 1930 |
| 1,804,771 | Hopkins | May 12, 1931 |
| 1,894,004 | Rose | Jan. 10, 1933 |
| 2,078,586 | Richter | Apr. 27, 1937 |
| 2,388,837 | Dye | Nov. 13, 1945 |
| 2,420,141 | Lessler | May 6, 1947 |